United States Patent [19]
Narusawa et al.

[11] Patent Number: 5,580,358
[45] Date of Patent: Dec. 3, 1996

[54] METHOD FOR MAKING A ELECTROLYTIC CAPACITOR

[75] Inventors: Hitoshi Narusawa; Gohji Uchikoshi, both of Oume, Japan

[73] Assignee: Shoei Co., Ltd., Tokyo, Japan

[21] Appl. No.: 497,946

[22] Filed: Jul. 3, 1995

[30] Foreign Application Priority Data

Jul. 5, 1994 [JP] Japan ................................ 6-153254
Jun. 6, 1995 [JP] Japan ................................ 7-135116

[51] Int. Cl.⁶ .................................................. H01G 9/00
[52] U.S. Cl. ......................... 29/25.03; 437/919; 361/517
[58] Field of Search ............................. 29/25.03, 25.02, 29/25.01; 437/209, 919; 361/517, 518, 519, 520, 521

[56] References Cited

U.S. PATENT DOCUMENTS

| | | | |
|---|---|---|---|
| 3,878,440 | 4/1975 | Ando | 361/521 |
| 4,745,521 | 5/1988 | De Lima Filho | 361/521 |
| 5,001,607 | 3/1991 | Breithaupt | 29/25.03 |
| 5,117,333 | 5/1992 | Kakuma et al. | 29/25.03 |
| 5,150,283 | 9/1992 | Yoshida et al. | 29/25.03 |
| 5,366,515 | 11/1994 | Kunugihara et al. | 29/25.03 |
| 5,412,532 | 5/1995 | Mishimori et al. | 29/25.03 |

FOREIGN PATENT DOCUMENTS

| | | |
|---|---|---|
| 0078001 | 10/1982 | European Pat. Off. . |
| 63-102156 | 5/1988 | Japan . |
| 5-259005 | 10/1993 | Japan . |
| 5-283302 | 10/1993 | Japan . |
| 6-61107 | 3/1994 | Japan . |
| 6-181147 | 6/1994 | Japan . |

*Primary Examiner*—Kevin M. Picardat
*Attorney, Agent, or Firm*—Morgan & Finnegan, LLP

[57] ABSTRACT

An electrolytic capacitor is manufactured by coiling an anode foil with a lead terminal fixed thereto, a cathode foil with a lead terminal fixed thereto, and a separator into a capacitor assembly, placing a sealing cap of an elastomeric material on the lead terminals which are inserted through respective holes defined in the sealing cap after an adhesive is applied in the holes, thereby attaching the sealing cap to the capacitor assembly, and heating the adhesive until the adhesive is fully set, thereby bonding the lead terminals and the sealing cap to each other. Thereafter, the capacitor assembly is impregnated with an electrolytic solution, and the capacitor assembly with the sealing cap attached thereto is inserted into a case and sealing the capacitor assembly in the case. The electrolytic capacitor thus manufactured has a relatively simple structure to effectively prevent the electrolytic solution from leaking out, and also has a long service life and is highly reliable.

11 Claims, 13 Drawing Sheets

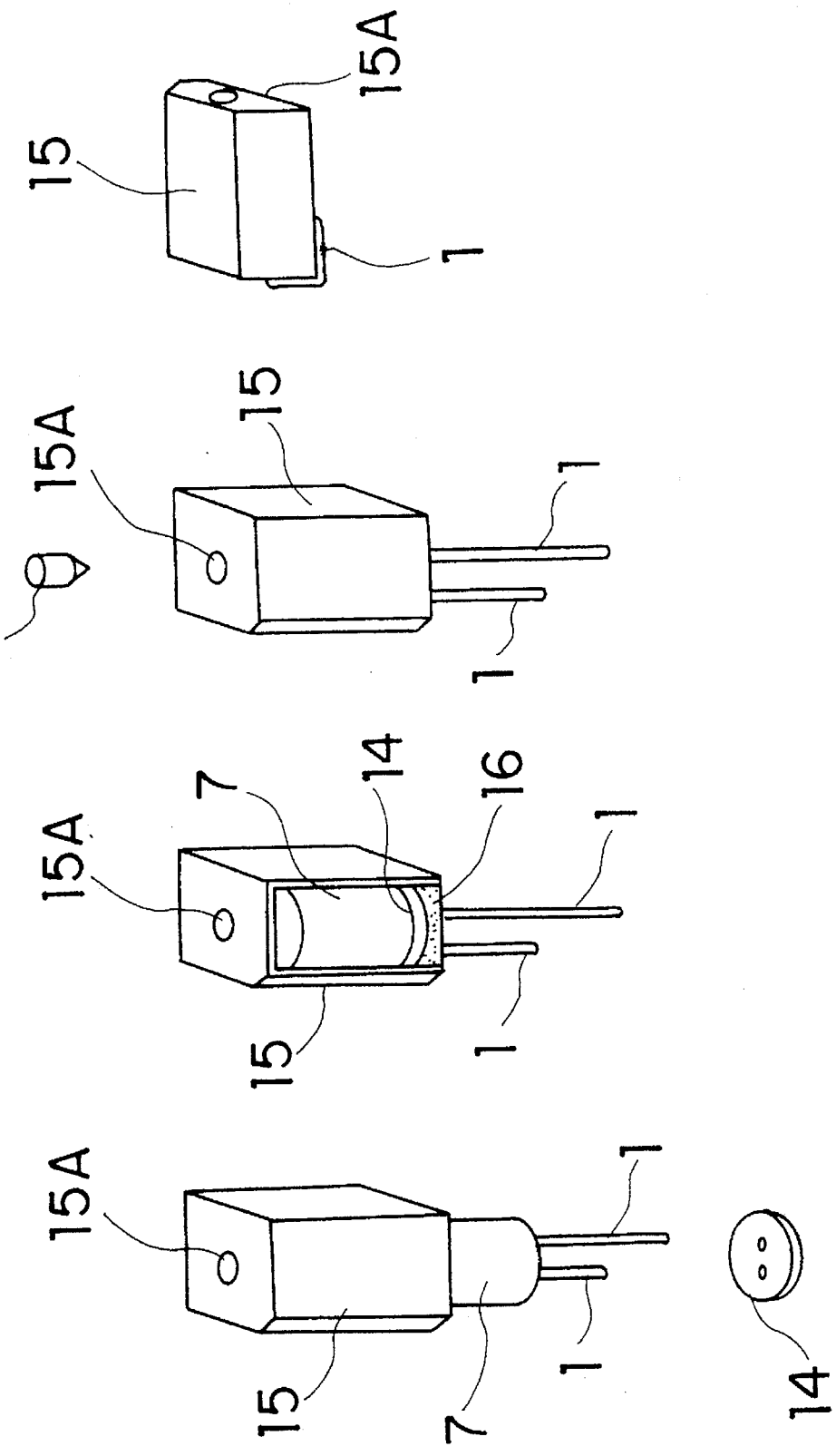

FIG. 7
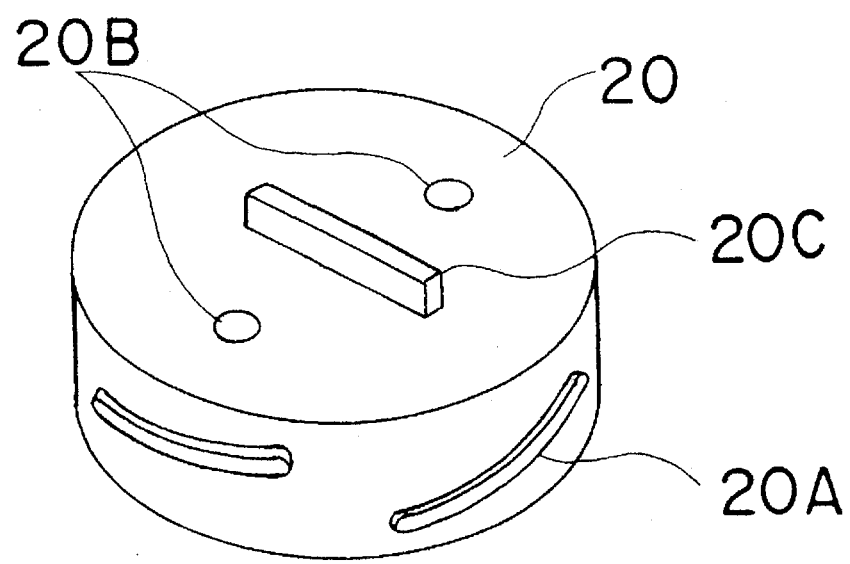
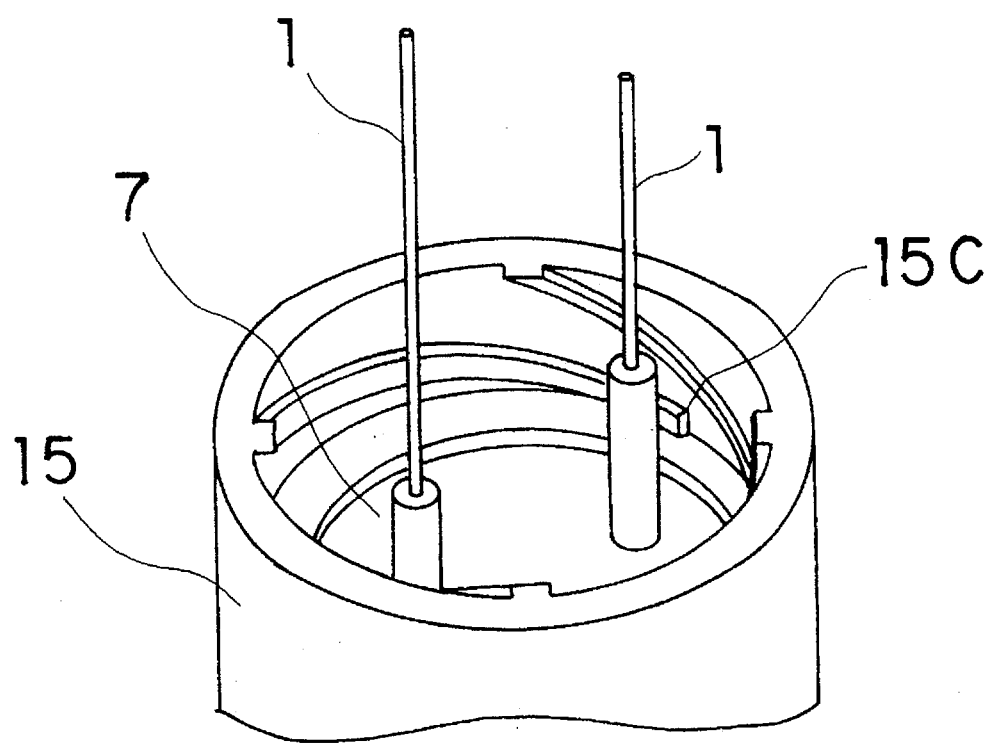

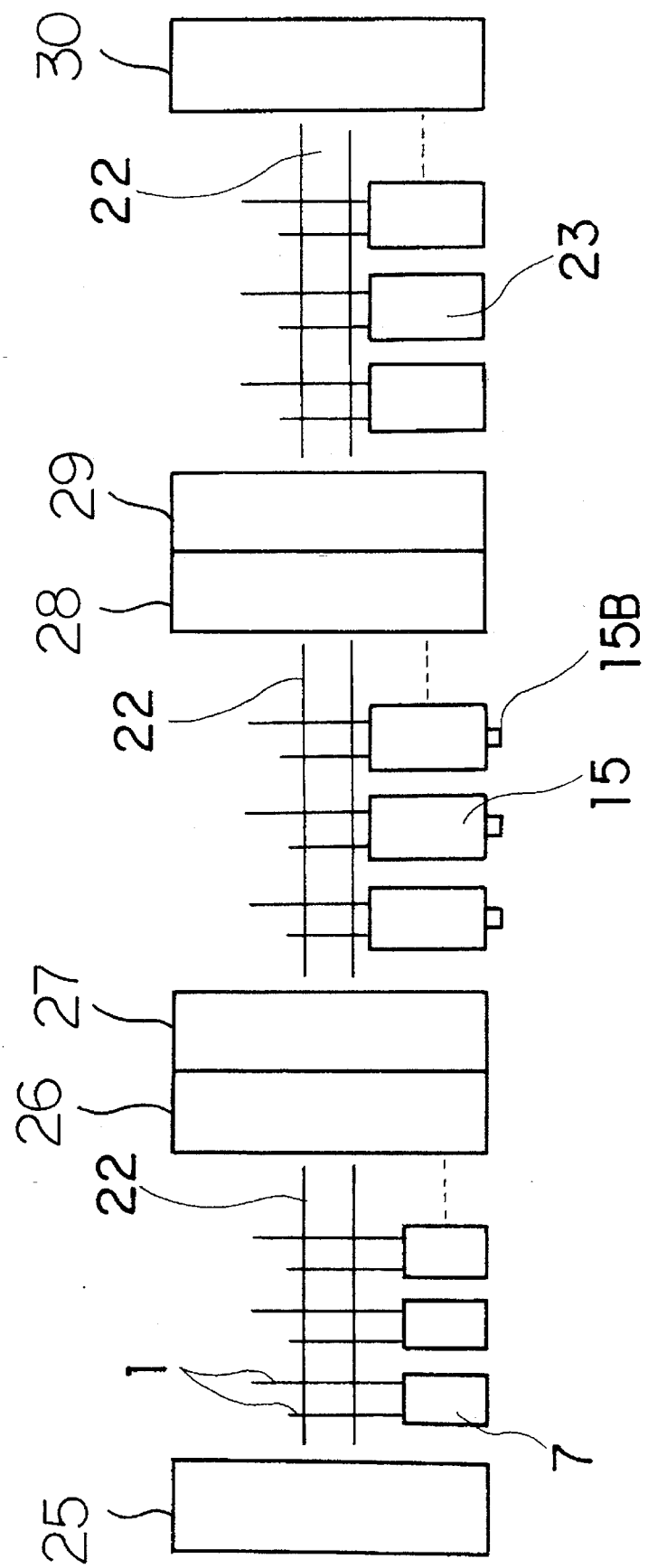

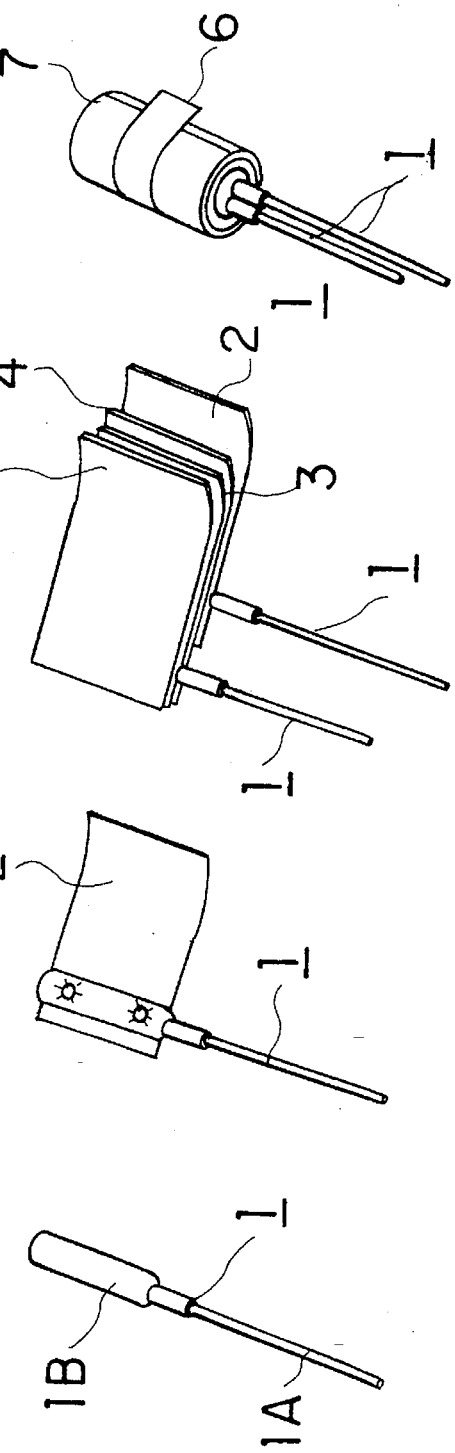

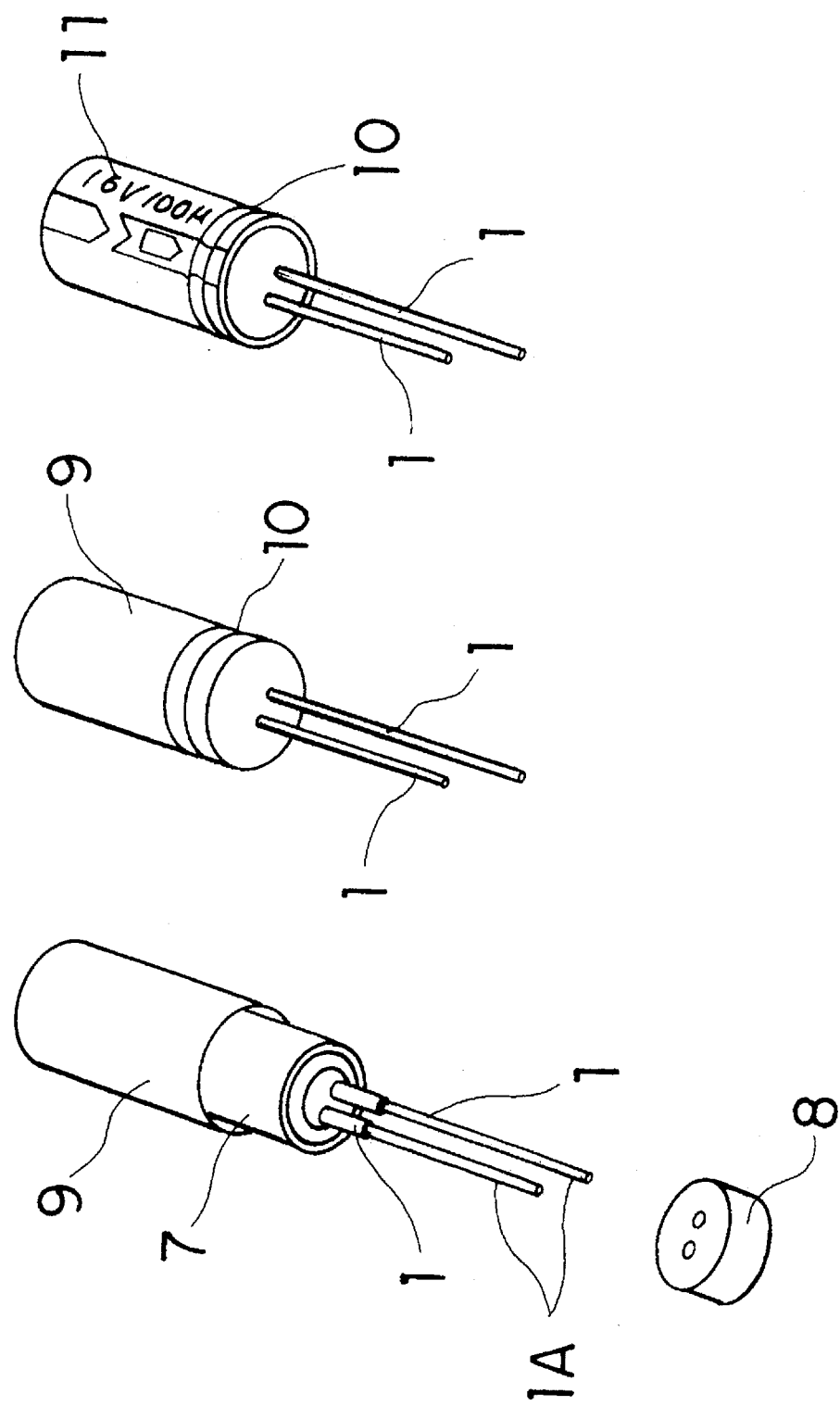

METHOD FOR MAKING A ELECTROLYTIC CAPACITOR

BACKGROUND OF THE INVENTION

The present invention relates to a method of manufacturing an electrolytic capacitor which is arranged to prevent an electrolytic solution from drying up for increased reliability.

There have been known a variety of causes of deterioration of electrolytic capacitors. Since a factor of major concern involved in the deterioration of electrolytic capacitors is a loss of electrolytic solution, however, efforts should be made to improve electrolytic capacitors to minimize a loss of electrolytic solution for increased reliability.

One conventional method of manufacturing an electrolytic capacitor will be described below with reference to FIGS. 11A through lid and 12A through 12C of the accompanying drawings. FIGS. 11A through lid and 12A through 12C show in perspective various parts of an electrolytic capacitor in a succession of steps of a method of manufacturing the electrolytic capacitor.

As shown in FIG. 11A, a lead 1A in the form of an iron or copper wire and an attachment lB of aluminum with its end pressed to flat shape are welded to each other, thereby forming a lead terminal 1.

Then, as shown in FIG. 11B, the surface of an anode foil 2 of aluminum, for example, is etched into a roughened surface by a wet etching process with an etchant which comprises a solution of hydrochloric acid or a mixed solution of sulfuric acid, nitric acid, and acetic acid. The anode foil 2 is immersed in an electrolytic solution, and anodized to produce an oxide film thereon.

One lead terminal 1 is fixed to the anode foil 2 as by staking or ultrasonic welding, and another lead terminal 1 is fixed to a cathode foil 3 (see FIG. 11C) of aluminum, for example, as by staking or ultrasonic welding.

As shown in FIG. 11C, the anode foil 2, a separator 4 comprising a sheet of insulating paper, the cathode foil 3, and a separator 5 comprising a sheet of insulating paper are superposed with each other.

Then, as shown in FIG. 11D, they are coiled into a cylindrical shape, and fastened together by a tape 6, thereby producing a capacitor assembly 7.

Thereafter, the capacitor assembly 7 is set in a vacuum impregnator, which is then evacuated to remove air from the capacitor assembly 7. An electrolytic solution is then poured into the capacitor assembly 7. Since the surface of the anode foil 2 has been roughened, the introduced electrolytic solution finds its way into minute pores formed in the roughened surface of the anode foil 2.

Instead of placing the capacitor assembly 7 in the vacuum impregnator, the capacitor assembly 7 may simply be immersed in an electrolytic solution under the atmospheric pressure.

As shown in FIG. 12A, a sealing cap 8 of rubber is press-fitted over the leads 1A of the lead terminals 1, and then an aluminum case 9 is placed over the capacitor assembly 7. Then, as shown in FIG. 12B, engaging ends of the sealing cap 8 and the aluminum case 9 are curled into a seam 10, thus hermetically sealing the capacitor assembly 7.

If necessary, the aluminum case 9 is then covered with a heat-shrinkable tube 11 that has been printed with various items of information which generally include the name of the manufacturer, a capacitor type number, ratings, a lot number, and polarities, as shown in FIG. 12C.

The electrolytic capacitor thus produced is aged for about one hour with an applied voltage which is about 10% higher than the rated voltage and at a temperature which is an upper-limit temperature of the temperature range for its usage. The electrolytic capacitor is so aged as to make up defects produced primarily in the oxide film on the anode foil 2 during the fabrication process, based on the self-recovery capability of the electrolytic capacitor.

The aging conditions differ depending on the manufacturing conditions of the electrolytic capacitor, and vary from manufacturer to manufacturer.

Electrolytic capacitors manufactured according to the above method are inspected based on the product specifications, and any electrolytic capacitors which are found defective by the inspection process are rejected.

It is generally known that electrolytic capacitors have a relatively short service life and hence are of low reliability. Specifically, the service life of electrolytic capacitors range from at most 1,000 hours to 2,000 hours.

Though the electrolytic capacitors have such a short life span, they find exceptionally widespread use because of their excellent qualities including the small size, the large capacity, and the low cost, and cannot be replaced with other types of capacitor in many applications.

However, there has been a growing demand for long-life electrolytic capacitors in view of the present trends toward electronic devices of higher performance and higher packing density.

Electrolytic capacitors are usually deteriorated by changes of properties of the electrolytic solution, a degradation of the aluminum oxide film, and other influential elements. Since a loss of electrolytic solution is one of the most responsible for the deterioration of electrolytic capacitors, the service life of electrolytic capacitors can be extended by preventing the electrolytic solution from drying up in use.

It is known that the electrolytic solution is lost through the sealing cap 8 (see FIG. 12A) of rubber. Nevertheless, the sealing cap 8 of rubber is used because it can easily be assembled and also allows a hydrogen gas to permeate itself easily for thereby preventing the aluminum case 9 from being broken due to an internal pressure buildup which is caused by a hydrogen gas generated by the cathode foil 3 when the electrolytic capacitor is aged as described above.

In a general life test, an electrolytic capacitor is placed under environmental conditions including a maximum temperature of usage to measure property deteriorations thereof. Under such static environmental conditions, however, the electrolytic capacitor is tested primarily in a mode in which the electrolytic solution is diffused out through the sealing cap 8 of rubber.

In actual usage, the electrolytic capacitor is energized and heat is generated therein which varies from time to time. Under such dynamic environmental conditions, the electrolytic solution or its vapor tends to leak out beyond the hermetically sealing capability between the lead terminals 1 and the sealing cap 8 of rubber owing to variations in the internal pressure buildup.

It has experimentally confirmed that the service life of an electrolytic capacitor is reduced to one-fifth or one-sixth the expected service life under the above dynamic environmental conditions even if the electrolytic capacitor is used in rated electric ranges.

In some electrolytic capacitors, the limit pressure of the hermetically sealing capability between the lead terminals 1 and the sealing cap 8 of rubber is of about 1.5 atmospheric pressures at an initial stage of usage, but falls to 1 atmospheric pressure or less in about six months due to the stress relaxation of rubber.

When the electrolytic capacitor is mounted on a printed-circuit board, the lead terminals 1 are often subjected to stresses. The lead terminals 1 are greatly strained particularly if there is a large dimensional difference between the distance between the lead terminals 1 and the distance between insertion holes defined in the printed-circuit board which receive the lead terminals 1 therein.

In the presence of such various adverse conditions, the hermetically sealing capability around the lead terminals 1 is impaired to allow the electrolytic solution to leak out, resulting in a reduction in the service life of the electrolytic capacitor.

It has been experienced that the undesirable loss of electrolytic solution tends to invite unexpected accidents of electronic devices which incorporate such electrolytic capacitors.

Recent years have seen wide use of an electrolytic solution containing a solvent of γ-butyrolactone on account of its high performance. The electrolytic solution has a high boiling point of 204 [°C.]. When the electrolytic solution leaks out onto a printed-circuit board, since it does not evaporate well, it brings out an undue conduction between interconnection patterns on the printed-circuit board. Such an undue conduction is liable to cause the circuit to operate out of control and suffer a burnout failure.

There have been proposed various electrolytic capacitors which are designed for protection against electrolytic solution leakage. However, none of the proposed electrolytic capacitors have proven effective enough to prevent the electrolytic solution from leaking out. One of the proposed electrolytic capacitors will be described below with reference to FIG. 13 of the accompanying drawings. Those reference numerals in FIG. 13 which are identical to those shown in FIGS. 11A through 11d and 12A through 12C denote identical parts, which will not be described in detail below.

The electrolytic capacitor shown in FIG. 13 has an epoxy resin film 12 disposed on the outer surface of the sealing cap 8 of rubber.

The electrolytic capacitor shown in FIG. 13 is manufactured in the same manner as the process described above with reference to FIGS. 11A through 11D and 12A through 12C, except that, after the electrolytic capacitor has been aged, an epoxy resin in liquid phase is flowed onto the entire exposed surface of the sealing cap 8 of rubber and then hardened into an epoxy resin film 12.

Since the epoxy resin in liquid phase is flowed onto the entire exposed surface of the sealing cap 8 of rubber to form the epoxy resin film 12, the capacitor assembly 7 has to be hermetically encased and sealed in the aluminum case 9 before the epoxy resin in liquid phase is placed on the sealing cap 8. If the capacitor assembly 7 were not hermetically sealed in the aluminum case 9 at the time the epoxy resin in liquid phase is placed on the sealing cap 8, then the epoxy resin in liquid phase would find its way into the capacitor assembly 7.

The epoxy resin used is required to be of cold-setting nature because if it were heated to a high setting temperature, the electrolytic solution would be damaged, and a produced vapor of the electrolytic solution would prevent the epoxy resin from being set.

However, many epoxy resins with good properties are of hot-setting nature. For example, a sealing epoxy resin often used with semiconductor devices can be set at a temperature of 170 [°C.] or higher.

Cold-setting epoxy resins fail to provide a good hermetically sealing capability and hence to completely prevent the electrolytic solution from leaking out. In addition, cold-setting epoxy resins are not sufficiently reliable as to the resistance to high temperatures upon reflow soldering and also as to the intimate contact with the lead terminals.

To solve the above problems which arise out of the use of the epoxy resin, it has been proposed to coat the outer or inner surface of the sealing cap 8 of rubber with a film of fluoroplastics. The film of fluoroplastics is heat-treated when it is coated on the sealing cap 8. Therefore, the electrolytic capacitor is free from the drawbacks which would be caused when the epoxy resin is set, and the electrolytic solution is prevented from leaking through the sealing cap 8.

However, the electrolytic capacitor still suffers other shortcomings. Specifically, when the lead terminals 1 are inserted through holes defined in the sealing cap 8, the capacitor assembly 7 is pressed against the sealing cap 8 under considerable forces. Nonetheless, the lead terminals 1 and the sealing cap 8 are merely held in contact with each other under pressure within the holes in the sealing cap 8. Such a pressure-dependent contact between the lead terminals 1 and the sealing cap 8 is not sufficiently effective to prevent the electrolytic solution from leaking out along the lead terminals 1.

SUMMARY OF THE INVENTION

It is therefore an object of the present invention to provide a method of manufacturing an electrolytic capacitor which has a relatively simple structure to effectively prevent the electrolytic solution from leaking out, and which has a long service life and is highly reliable.

According to the present invention, basically, before a capacitor assembly is impregnated with an electrolytic solution, an adhesive for bonding lead terminals extending from the capacitor assembly and a sealing cap or an adhesive stopper to each other is applied in or around holes defined in the sealing cap or the adhesive stopper, and then set with heat after the lead terminals are inserted through the holes.

More specifically, there is provided in accordance with a first aspect of the present invention a method of manufacturing an electrolytic capacitor, comprising the steps of coiling an anode foil with a lead terminal fixed thereto, a cathode foil with a lead terminal fixed thereto, and a separator into a capacitor assembly, attaching a sealing cap made of an elastomeric material and having holes, to the capacitor assembly by inserting the lead terminals through the respective holes with adhesive applied thereto, heating the adhesive until the adhesive is set so as to bond the lead terminals and the sealing cap to each other, impregnating the capacitor assembly with an electrolytic solution, and inserting the capacitor assembly with the sealing cap attached thereto into a case and sealing the capacitor assembly in the case.

The method alternatively comprises the step of attaching the sealing cap to the capacitor assembly by inserting the lead terminals with an adhesive applied thereto through the respective holes defined in the sealing cap.

According to a second aspect of the present invention, there is also provided a method of manufacturing an electrolytic capacitor, comprising the steps of coiling an anode foil with a lead terminal fixed thereto, a cathode foil with a lead terminal fixed thereto, and a separator into a capacitor assembly, attaching an adhesive stopper with holes to the capacitor assembly by inserting the lead terminals through the respective holes, inserting the capacitor assembly with the adhesive stopper attached thereto into a case having an opening for introducing an electrolytic solution and discharging a gas, applying an adhesive to a side of the case where the adhesive stopper is positioned and heating the adhesive until the adhesive is set so as to bond the adhesive stopper and the lead terminals to each other and seal the capacitor assembly in the case, introducing an electrolytic solution through the opening to impregnate the capacitor assembly with the electrolytic solution, and closing the opening to seal the case.

According to a third aspect of the present invention, there is further provided a method of manufacturing an electrolytic capacitor, comprising the steps of coiling an anode foil with a lead terminal fixed thereto, a cathode foil with a lead terminal fixed thereto, and a separator into a capacitor assembly, inserting the capacitor assembly into a case having an opening for introducing an electrolytic solution and discharging a gas, attaching an adhesive stopper with holes to the capacitor assembly in the case by inserting the lead terminals through the respective holes, applying an adhesive to a side of the case where the adhesive stopper is positioned and heating the adhesive until the adhesive is set so as to bond the adhesive stopper and the lead terminals to each other and seal the capacitor assembly in the case, introducing an electrolytic solution through the opening to impregnate the capacitor assembly with the electrolytic solution, and closing the opening to seal the case.

In the second and third aspects of the present invention, the adhesive stopper is composed of two half members divided along a line passing through the respective holes defined therein.

In the second and third aspects of the present invention, the method further comprises the step of, after the adhesive stopper is inserted in the case, a portion of the case is heated and pressed against the adhesive stopper by a heating iron.

In the second and third aspects of the present invention, the method further comprises the step of fitting a plug into the opening until a tip end of the plug is held against the capacitor assembly thereby closing the opening and sealing the case.

In the second and third aspects of the present invention, the method further comprises the steps of closing the opening with a heating iron having a concave surface so as to seal the case, thereafter cooling the heating iron, and then removing the heating iron from the case.

Since the lead terminals and the sealing cap are held in highly intimate contact with each other, the electrolytic solution is prevented from leaking out between the lead terminals and the sealing cap. The adhesive which sealingly bonds the lead terminals and the sealing cap or the adhesive stopper to each other is set with heat in the absence of any electrolytic solution. Consequently, the adhesive, which may be made of an epoxy resin, for example, can be well set at a high temperature for increased fluid-tightness. After the capacitor assembly with the lead terminals extending therefrom has been sealed in a case in a fluid-tight manner, an opening defined in the case for introducing the electrolytic solution and discharging a hydrogen gas therethrough can easily be closed off by a heating iron.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 2A through 2D are perspective views showing successive steps of a method of manufacturing an electrolytic capacitor according to an embodiment of the present invention;

FIG. 7 is a sectional perspective view of another electrolytic capacitor which is similar to the electrolytic capacitor shown in FIG. 6;

FIG. 9 is a schematic diagram showing a process sequence of an automatic production system with tape carrier;

FIGS. 11A through 11D and 12A through 12C are perspective views of various parts of an electrolytic capacitor in a succession of steps of a method of manufacturing the electrolytic capacitor.

DETAILED DESCRIPTION OF THE PREFERRED EMBODIMENTS

Figure 1:
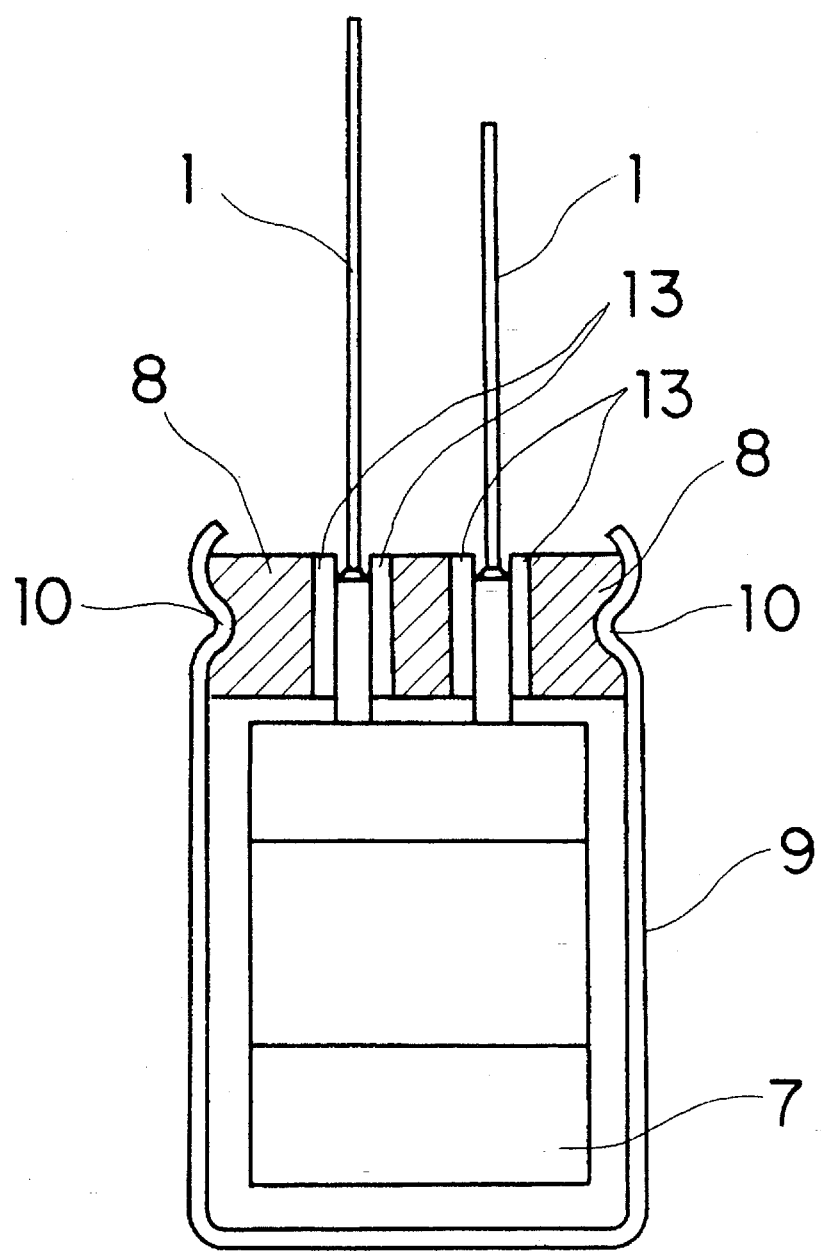
FIG. 1 is a cross sectional view of an electrolytic capacitor manufactured according to the present invention.

Like or corresponding parts are denoted by like or corresponding reference characters throughout views.

Figure 13:
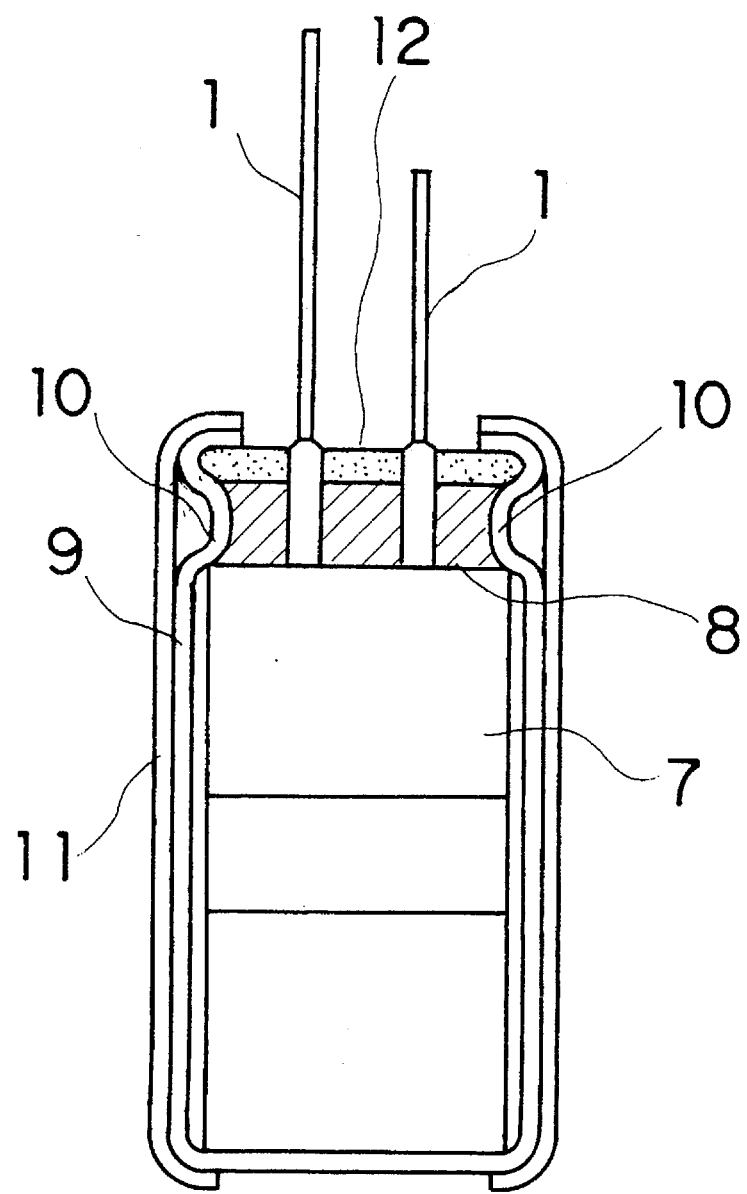
FIG. 13 is a cross sectional view of a proposed electrolytic capacitor to be improved according to the present invention.

FIG. 1 shows in a cross sectional view an electrolytic capacitor manufactured according to the present invention. Those reference numerals in FIG. 1 which are identical to those shown in FIG. 13 represent identical parts, which will not be described in detail below.

The electrolytic capacitor shown in FIG. 1 has an adhesive 13 of epoxy resin, for example, between the lead terminals 1 and the sealing cap 8 of rubber.

To manufacture the electrolytic capacitor shown in FIG. 1, the capacitor assembly 7 is produced in the same manner as the process described above with reference to FIGS. 11A through 11D. Thereafter, an adhesive 13 is applied to outer surfaces of the lead terminals 1 that extend from the capacitor assembly 7, or to inner surfaces of the holes defined in the sealing cap 8 of rubber. Then, the sealing cap 8 is press-fitted over the lead terminals 1, and they are heated at 190 [°C.] for 10 minutes, for example, to set the applied adhesive.

The adhesive 13 may be any of various materials. For example, the adhesive 13 may comprise a powder of epoxy resin, or sleeves or beads compression-molded from a powder of epoxy resin, or a liquid of epoxy resin. The adhesive 13 may alternatively be made of phenolic resin, silicone resin, or fluoroplastics.

If a powder of epoxy resin is employed, then the lead terminals 1 or the sealing cap 8 may be heated to an appropriate temperature, and then the powder of epoxy resin may be applied to the lead terminals 1 or the sealing cap 8, so that the applied powder of epoxy resin is melted to a certain extent.

If sleeves or beads compression-molded from a powder of epoxy resin are employed, then the sleeves or beads may be fitted over the lead terminals 1 and then inserted into the holes in the sealing cap 8, or the sleeves or beads may be fitted in the holes in the sealing cap 8 and then the lead terminals 1 may be inserted into the sleeves or beads in the holes in the sealing cap 8.

If a liquid of epoxy resin is employed, it is coated on outer surfaces of the lead terminals 1 or inner surfaces of the holes in the sealing cap 8. The liquid of epoxy resin may appear simple to use, but is actually the most difficult to handle among the above adhesive alternatives.

After the adhesive 13 has been applied, the capacitor assembly 7 with the sealing cap 8 installed is set in a vacuum impregnator, which is then evacuated to remove air from the capacitor assembly 7. An electrolytic solution is then poured into the capacitor assembly 7. The introduced electrolytic solution finds its way into minute pores formed in the surface of the anode foil 2 which has been roughened.

An aluminum case 9 is placed over the capacitor assembly 7. Then, engaging ends of the sealing cap 8 and the aluminum case 9 are curled into a seam 10, thus hermetically sealing the capacitor assembly 7.

If necessary, the aluminum case 9 is then covered with a heat-shrinkable tube (see FIG. 12C) that has been printed with various items of information which generally include the name of the manufacturer, a capacitor type number, ratings, a lot number, and polarities.

The electrolytic capacitor thus produced is aged for about one hour with an applied voltage which is about 10% higher than the rated voltage and at a temperature which is an upper-limit temperature of the temperature range for its usage. Even if a hydrogen gas is emitted from the cathode foil upon aging, no problem arises because a portion of the sealing cap 8 is exposed as it is not covered by the adhesive 13.

Electrolytic capacitors thus manufactured are inspected based on the product specifications, and any electrolytic capacitors which are found defective by the inspection process are rejected, and only those electrolytic capacitors which are accepted are picked out as completed products.

FIGS. 2A through 2D show in perspective successive steps of a method of manufacturing an electrolytic capacitor according to an embodiment of the present invention.

First, the capacitor assembly 7 is produced in the same manner as the process described above with reference to FIGS. 11A through 11D.

Then, as shown in FIG. 2A, the lead terminals 1 extending from the capacitor assembly 7 are inserted into respective holes defined in an adhesive stopper 14 which is made of rubber, for example, and a case 15 with an opening 15A defined in its top end is placed over the capacitor assembly 7.

Unlike the sealing cap 8, the adhesive stopper 14 does not serve to hermetically seal the capacitor assembly 7 in the case 15, but is used to prevent an applied adhesive, e.g., a powder of epoxy resin or a liquid of epoxy resin, from flowing into the case 15.

The case 15 is made of polyphenylene sulfide (PPS). The opening 15A defined in the top end of the case 15 is used to pour an electrolytic solution into the capacitor assembly 7 and discharge a hydrogen gas from the capacitor assembly 7.

Since the PPS is a heat-resistant polymer, it is effective to sufficiently protect the electrolytic solution from high temperatures upon reflow soldering. Therefore, the case 15 of PPS makes it suitable to use the electrolytic capacitor as a surface-mountable electrolytic capacitor.

Then, as shown in FIG. 2B, an adhesive 16 of epoxy resin, for example, is fitted in a bottom opening of the case 15 over the adhesive stopper 14, and is set by being heated at a temperature of 160 (°C.) for 30 minutes, thereby hermetically sealing the lead terminals 1. In FIG. 2B, the case 15 is shown as partly cut away to make the capacitor assembly 7, the adhesive stopper 14, and the adhesive 16 partly visible only for illustrative purpose.

As described above with reference to FIG. 1, the adhesive 16 may comprise a powder, compression-molded sleeves or beads, or a liquid of any of various materials including epoxy resin, phenolic resin, silicone resin, or fluoroplastics, for example. Alternatively, the adhesive 16 may comprise pellets having holes for insertion of the lead terminals 1 therethrough. If the adhesive 16 comprises pellets, then the adhesive pellets and the adhesive stopper 14 may be integrally combined as a laminated assembly for easy handling.

Thereafter, the entire assembly is set in a vacuum impregnator, which is then evacuated to remove air within the case 15 through the opening 15A.

An electrolytic solution is then poured into the case 15 through the opening 15A. The introduced electrolytic solution finds its way into minute pores formed in the surface of the anode foil 2 which has been roughened.

The electrolytic capacitor thus produced is aged for about one hour with an applied voltage which is about 10% higher than the rated voltage and at a temperature which is an upper-limit temperature of the temperature range for its usage. Even if a hydrogen gas is emitted from the cathode foil upon aging, it can readily be discharged through the hole 15A in the case 15.

Then, as shown in FIG. 2C, the opening 15A is hermetically sealed by a plug 17 which is made of an elastomeric material such as rubber or plastics. The plug 17 has a conical pointed end that is held against the top end of the capacitor assembly 7 to hold the capacitor assembly 7 firmly in position in the case 15. Therefore, even when the capacitor assembly 7 is vibrated subsequently, since it is held firmly in position by the plug 17, no undue stresses are applied from the capacitor assembly 7 to the lead terminals 1. Any undue stresses exerted to the lead terminals 1 are responsible for performance degradations such as an increased leakage current and an increased energy loss.

Thereafter, as shown in FIG. 2D, the lead terminals 1 are formed to desired shape. Electrolytic capacitors thus manufactured are inspected based on the product specifications, and any electrolytic capacitors which are found defective by the inspection process are rejected, and only those electrolytic capacitors which are accepted are picked out as completed products.

Figure 3A:
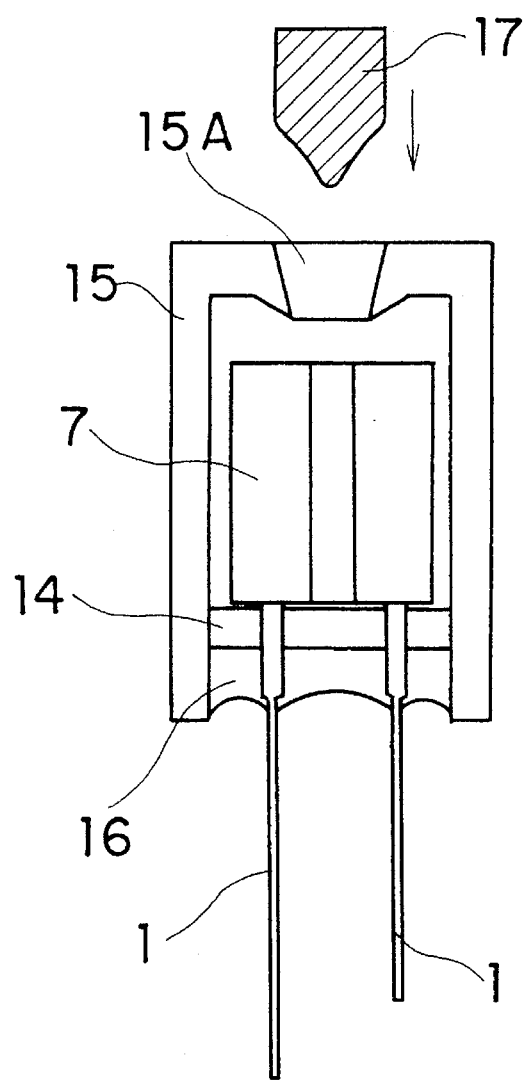
FIGS. 3A and 3B are cross sectional views showing a step of hermetically sealing an opening in a case with a plug in the method illustrated in FIGS. 2A through 2D.
Figure 3B:
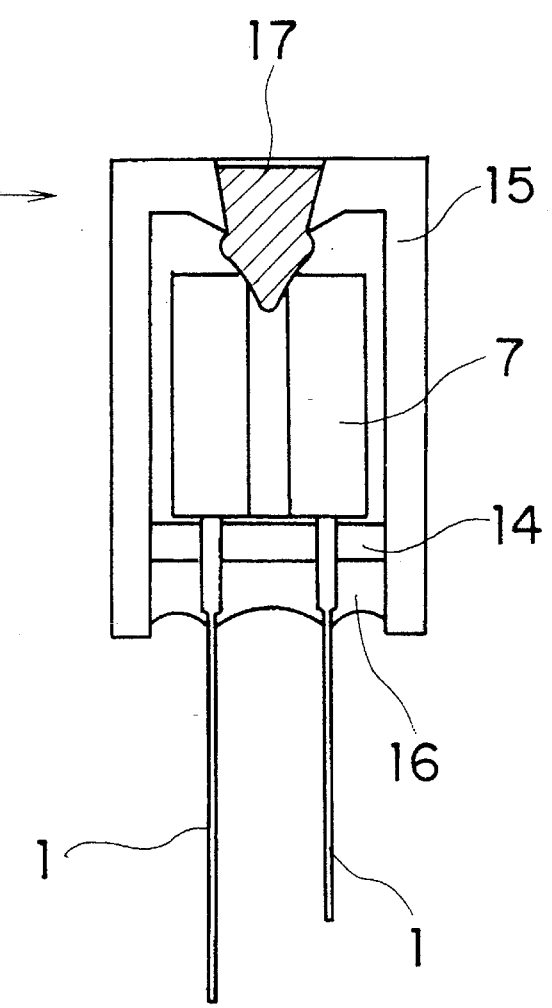

FIGS. 3A and 3B show in cross sectional views the step of hermetically sealing the opening 15A in the case 15 with the plug 17.

As shown in FIGS. 3A and 3B, when the plug 17 which is made of an elastomeric material and has a conical pointed end is pressed into the opening 15A, the conical pointed end of the plug 17 enters a central space in the coiled layers of the capacitor assembly 7 for thereby holding the upper end of the capacitor assembly 7 firmly in the case 15. Therefore, the capacitor assembly 7 is rendered highly resistant to vibration.

Figure 4A:
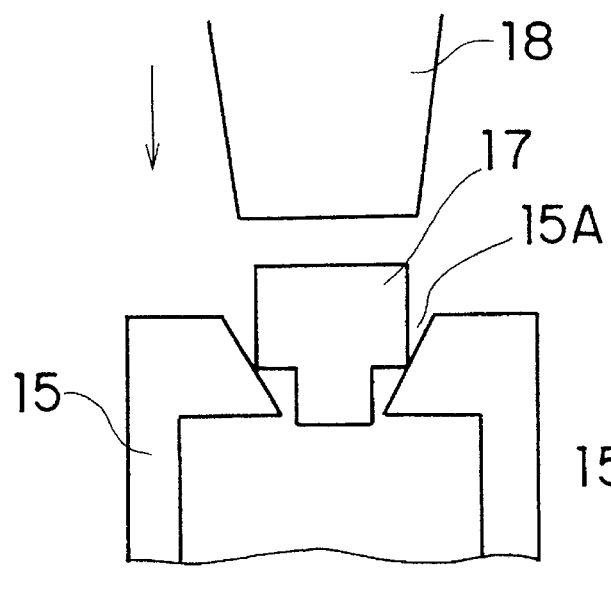
FIGS. 4A and 4B are cross sectional views showing an alternative step of hermetically sealing an opening in a case with a plug in the method illustrated in FIGS. 2A through 2D.
Figure 4B:
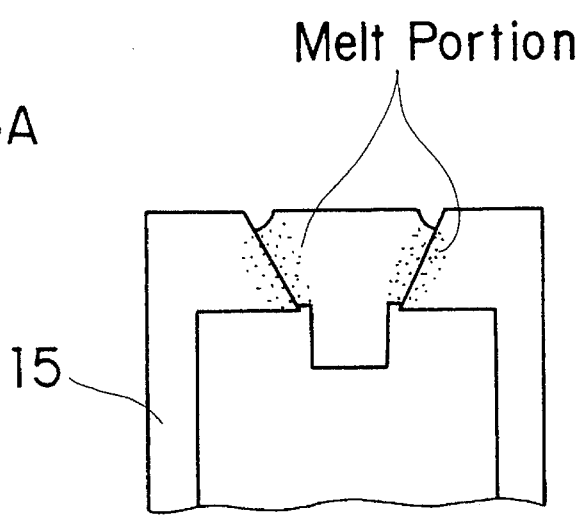

FIGS. 4A and 4B show in cross sectional view an alternative step of hermetically sealing the opening 15A in the case 15 with the plug 17.

As shown in FIGS. 4A and 4B, a plug 17 of PPS is placed in the hole 15A in the case 15, and the plug 17 is fused to the surface of the hole 15A by an ultrasonic energy radiated from an ultrasonic horn 18, thereby hermetically sealing the hole 15A.

Figure 5A:
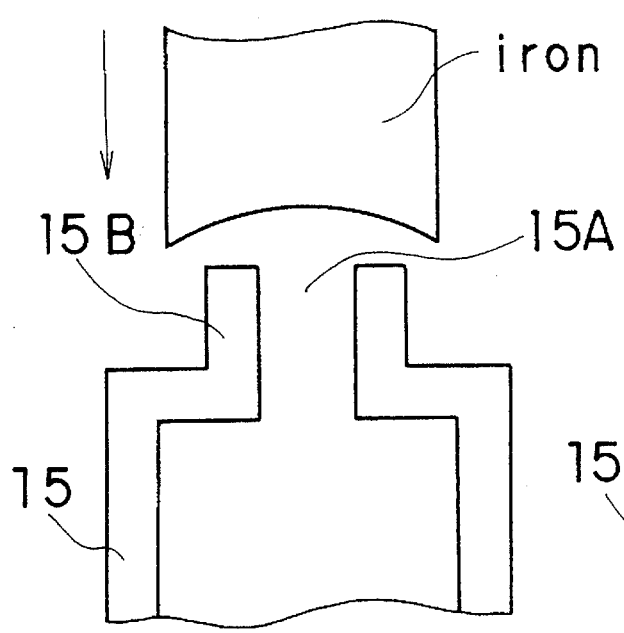
FIGS. 5A and 5B are cross sectional views showing a further alternative step of hermetically sealing an opening in a case with a plug in the method illustrated in FIGS. 2A through 2D.
Figure 5B:
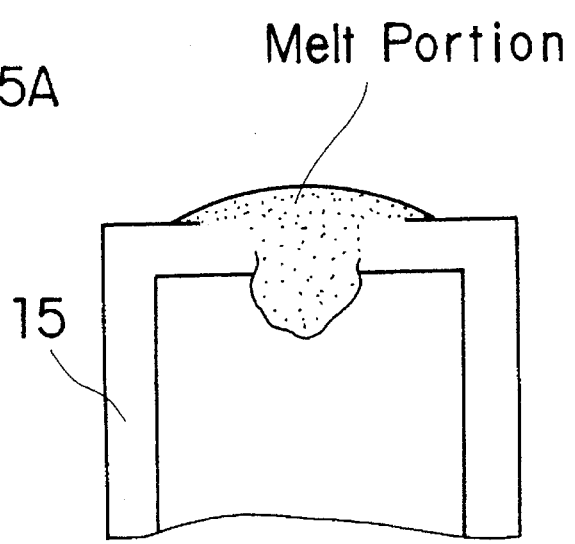

FIGS. 5A and 5B show in cross sectional views a further alternative step of hermetically sealing the opening 15A in the case 15 with the plug 17.

As shown in FIGS. 5A and 5B, a collar 15B is raised outwardly around the opening 15A in the case 15. A concave surface of a heating iron which is heated to a high temperature is pressed against the collar 15B to melt and collapse the collar 15B until the opening 15A is closed and sealed.

The height of the collar 15B and hence the amount of the PPS to be melted and collapsed, the temperature to which the collar 15B is heated, and the time for which the collar 15B is heated are selected to cause the melted material to project from the opening 15A downwardly into the case 15 as shown in FIG. 5(B). The projecting end of the material may be held against the upper end of the capacitor assembly 7 to hold the capacitor assembly 7 firmly in position in the case 15 for increased vibration resistance.

In order to keep the melted material in a convex shape on the upper surface of the case 15 as shown in FIG. 5(B), the heating iron may be cooled after the PPS is melted, and then removed away from the case 15 after the PPS is hardened.

The adhesive stopper 14 shown in FIGS. 2A through 2D and 3A and 3B is not required to seal the capacitor assembly 7 in the case 15 in a fluid-tight fashion, unlike the sealing cap 8 shown in FIG. 1, but may only be effective to prevent the adhesive 16 from flowing into the case 15. Furthermore, the adhesive stopper 14 is not required to be permeable to a hydrogen gas. For these reasons, the adhesive stopper 14 may be made of any of various materials other than rubber, e.g., materials which are highly resistant to erosion by the electrolytic solution and highly resistant to heat, such as PPS or fluoroplastics, provided the adhesive stopper 14 can be machined with precision not to allow the adhesive 16 to pass between the lead terminals 1 and the adhesive stopper 14 and also between the adhesive stopper 14 and the case 15.

Specifically, the adhesive stopper 14 is required to be machined with such a degree of precision that the distance between the lead terminals 1 and the adhesive stopper 14 and also between the adhesive stopper 14 and the case 15 is of 20 [μm] or less. Such a degree of precision can be achieved by presently available precision-machining techniques.

Therefore, the adhesive stopper 14 may be made of a rigid material such as PPS or fluoroplastics. If the adhesive stopper 14 is made of such a rigid material, then when the adhesive 16 is applied, the adhesive stopper 14, the case 15, and the adhesive 16 are joined in an integral structure which can sufficiently withstand severe conditions in which the electrolytic capacitor is used, i.e., an internal pressure of 3 [kg/cm$^2$] at a temperature of 105 [°C.]. The adhesive stopper 14 of a rigid material permits the lead terminals 1 to be positioned and oriented accurately, so that dimensional variations of the lead terminals 1 of produced electrolytic capacitors are minimized.

Figure 6:
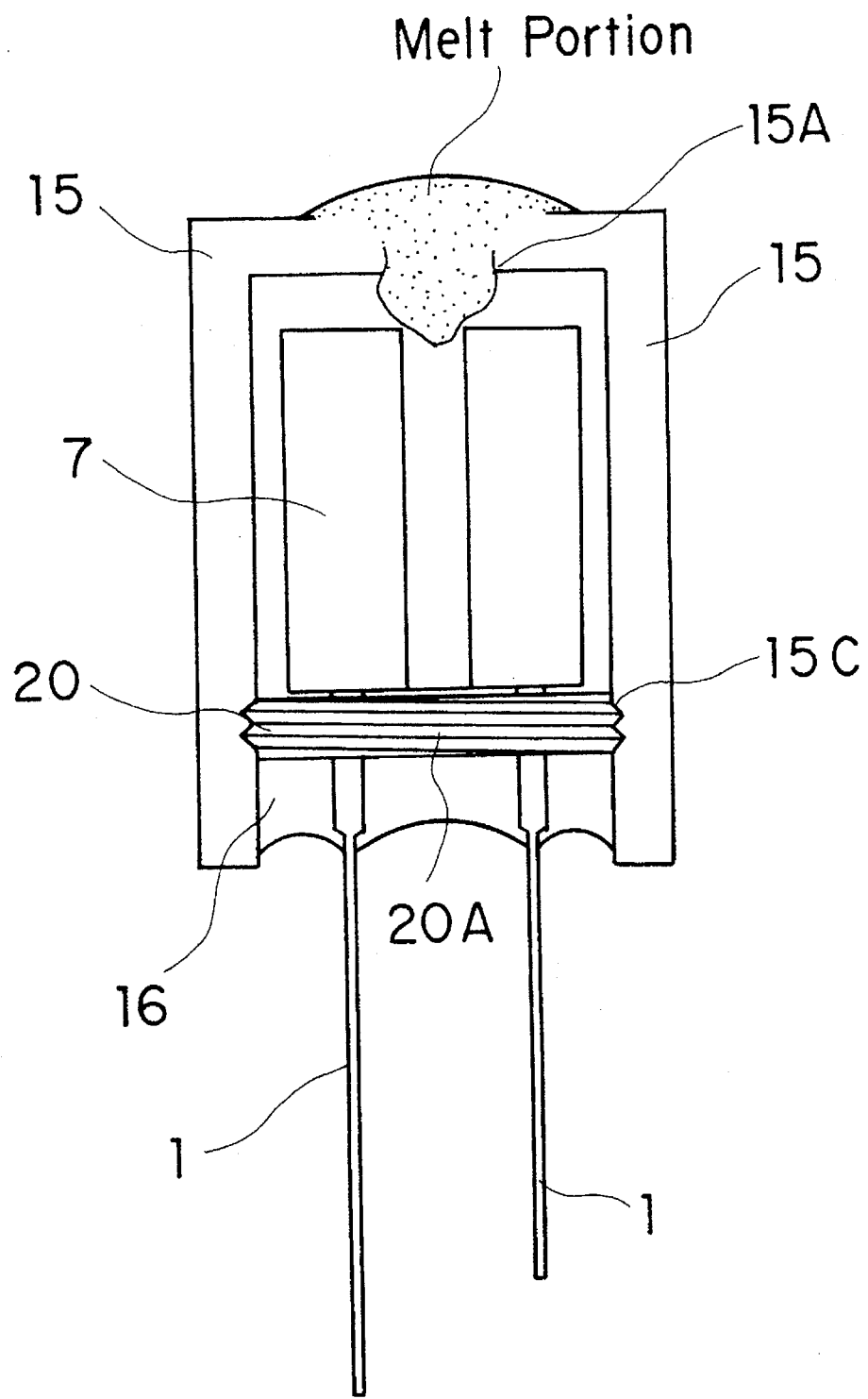
FIG. 6 is a cross sectional view of an electrolytic capacitor having an adhesive stopper made of a rigid material, which is manufactured by the method according to the present invention.

FIG. 6 shows in a cross sectional view an electrolytic capacitor having an adhesive stopper made of a rigid material, which is manufactured by the method according to the present invention.

The electrolytic capacitor shown in FIG. 6 differs from the electrolytic capacitors shown in FIG. 1 through 5A, 5B in that an adhesive stopper 20 is made of a rigid material such as PPS, for example. Because the adhesive stopper is made of a rigid material, it can be of a threaded structure that can mechanically be coupled to the case 15. However, the adhesive stopper may be of a disk-shaped structure, rather than a threaded structure. For example, the adhesive stopper 14 shown in FIGS. 2B and 3A, 3B may be made of a rigid material such as PPS or fluoroplastics, as described above so as to bring various merits.

As illustrated in FIG. 6, the adhesive stopper 20 has an externally threaded outer circumferential surface 20A, and the case 15 has an internally threaded inner circumferential surface 15C in the vicinity of the opening thereof for insertion of the capacitor assembly 7 therethrough.

The lead terminals 1 are inserted through respective holes defined in the adhesive stopper 20 thereby connecting the capacitor assembly 7 to the adhesive stopper 20, and then the externally threaded outer circumferential surface 20A of the adhesive stopper 20 is threaded into the internally threaded inner circumferential surface 15C of the case 15 thus integrally joining the adhesive stopper 20 to the case 15. Thereafter, the adhesive 16 is applied to seal the capacitor assembly 7 in the case 15 in a fluid-tight manner. Since the adhesive stopper 20 and the case 15 are mechanically integrally joined to each other, the mechanical strength of the electrolytic capacitor is increased.

The externally threaded outer circumferential surface 20A and the internally threaded inner circumferential surface 15C preferably have threads of larger pitches than ordinary threads because the adhesive stopper 20 and the case 15 can easily be molded of PPS and easily assembled together.

FIG. 7 shows in a sectional perspective view another electrolytic capacitor which is similar to the electrolytic capacitor shown in FIG. 6.

As shown in FIG. 7, the electrolytic capacitor includes an adhesive stopper 20 having an externally threaded outer circumferential surface 20A with threads of relatively large pitches, and the case 15 has an internally threaded inner circumferential surface 15C with threads of relatively large pitches in the vicinity of the opening thereof for insertion of the capacitor assembly 7 therethrough.

The adhesive stopper 20 also has a pair of holes 20B for insertion of the lead terminals 1 therethrough, and a straight ridge 20C disposed on a surface thereof and extending between the holes 20B. The ridge 20C can be gripped and turned by a jig when the adhesive stopper 20 is threaded into the case 15 by meshing engagement between the threads on the externally threaded outer circumferential surface 20A and the threads on the internally threaded inner circumferential surface 15C. The ridge 20C may be replaced with a straight or crisscross slot defined in the surface of the adhesive stopper 20 for receiving the tip end of a screwdriver bit.

Figures 8A, 8B:
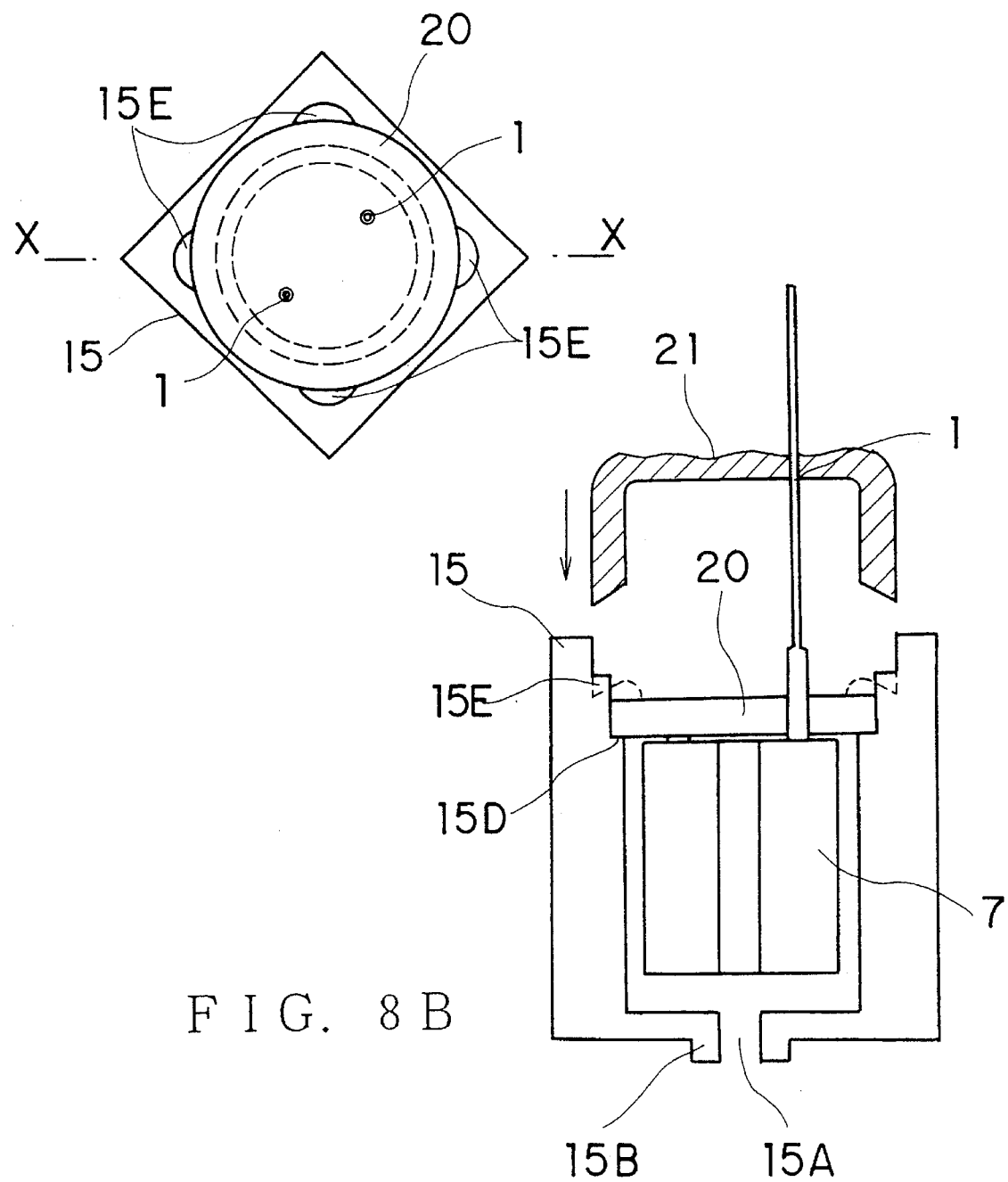
FIGS. 8A and 8B are plan and cross sectional views, respectively, an electrolytic capacitor having an adhesive stopper made of a right material, which is manufactured by the method according to the present invention.

FIGS. 8A is a plan view and FIG. 8B is a cross sectional view along the dotted line X of an electrolytic capacitor having an adhesive stopper made of a rigid material, which is manufactured by the method according to the present invention.

As shown in FIGS. 8A and 8B, the electrolytic capacitor includes a case 15 having an inner shoulder 15D which engages and places an adhesive stopper 20 thereon and a plurality of regions 15E positioned around the adhesive stopper 20 which are melted and collapsed over the adhesive stopper 20 by a heating iron 21.

The adhesive stopper 20 is press-fitted over the lead terminals 1 of the capacitor assembly 7, and they are placed in the case 15 such that the adhesive stopper 20 has its outer circumferential edge engaged by and placed on the inner shoulder 15D. Then, the regions 15E positioned around the adhesive stopper 20 are heated and pressed by the heating iron 21. The regions 15E are now melted and collapsed over the outer circumferential edge of the adhesive stopper 20, thereby securely anchoring the adhesive stopper 20 to the case 15.

Subsequently, the adhesive 16 is applied and hardened to seal the capacitor assembly 7 in the case 15 in a fluid-tight manner. After the case 15 is evacuated through the hole 15A, an electrolytic solution is poured into the case 15, and then the electrolytic capacitor is aged. Thereafter, the opening 15A is closed by a heating iron in the same manner as described above with reference to FIGS. 5A and 5B.

When the regions 15E are heated and pressed by the heating iron 21, the adhesive stopper 20 should preferably be also heated and pressed by the heating iron 21 to the extent the adhesive stopper 20 is slightly melted, so that the adhesive stopper 20 and the case 15 can be well joined to each other with increased bonding strength. Either one of the threaded structures shown in FIGS. 6 and 7 may also be incorporated into the structure shown in FIGS. 8A and 8B for increased light-tightness.

In the embodiment shown in FIGS. 8A and 8B, at least the case 15 needs to be made of a thermoplastic resin, and the adhesive stopper 20 may also be made of a thermoplastic resin for better results. Alternatively, the case 15 and the adhesive stopper 20 may be made of the same thermoplastic resin such as PPS, for example.

Generally, bonding between materials which include PPS cannot easily be achieved. While an adhesive of epoxy resin among others is the most reliable for such bonding, the bonding capability of the adhesive with respect to a molded surface of PPS is not complete. Therefore, it is customary to process such a molded surface of PPS with sand blasting or an ultraviolet radiation. In the embodiment shown in FIGS. 8A and 8B, since the regions 15E which are melted by the heating iron 21 have roughened surfaces, the bonding between the regions 15E and the adhesive stopper 20 is strong.

Electrolytic capacitors are generally mass-produced frequently by an automatic production system with tape carrier.

FIG. 9 schematically shows a process sequence of such an automatic production system with tape carrier.

As shown in FIG. 9, a continuous tape 22 extends through various processing stations which successively produce completed electrolytic capacitors 23.

Capacitor assemblies 7 with lead terminals 1 are fabricated in the manner described above, and the lead terminals 1 of successive capacitor assemblies 7 are temporarily attached to the tape 22. Then, the tape 22 is transported through the processing stations 25 through 30 in which the capacitor assemblies 7 are combined with cases 15 and processed in various steps until electrolytic capacitors 23 are completed and inspected. The capacitor assemblies 7 with lead terminals 1 are made at the station 25. The capacitor assemblies 7 are inserted in the case 15 at the station 26. The adhesive is heated and set at the station 27. Then, the capacitor assemblies are impregnated with the electrolytic solution at the station 28 and sealed at the station 29. Finally, the electrolytic capacitors are subject to the inspection at the station 30.

After the lead terminals 1 have been temporarily attached to the tape 22, adhesive stoppers 20 as shown in FIGS. 6 through 8A, 8B cannot be press-fitted over the lead terminals 1. Therefore, it is necessary to install the adhesive stoppers 20 on the lead terminals 1 before the lead terminals 1 are temporarily attached to the tape 22.

Though such an installing step can be carried out, it requires the automatic fabrication system to be modified or poses process supervision problems because part of a case assembling process has to be incorporated into an aluminum foil winding process.

Figure 10A:
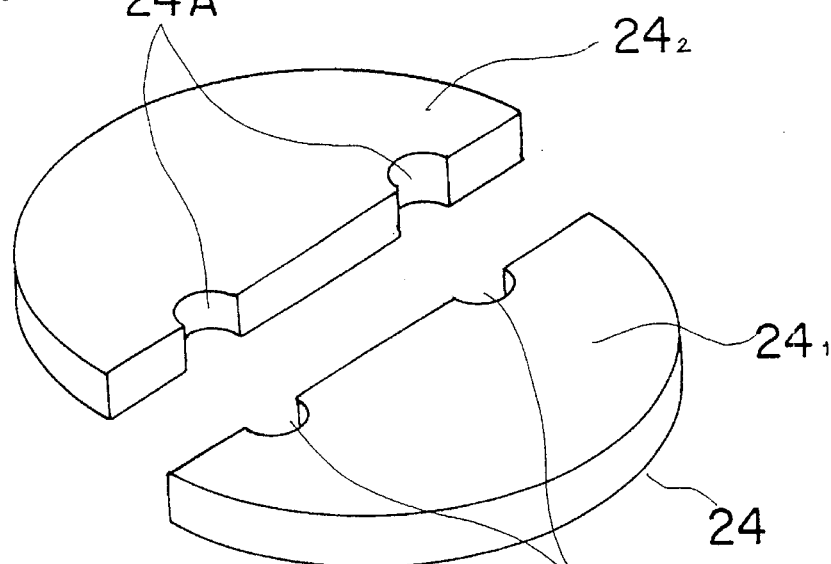
FIGS. 10A and 10B are perspective views of different adhesive stoppers suitable for tape carrier packaging.
Figure 10B:
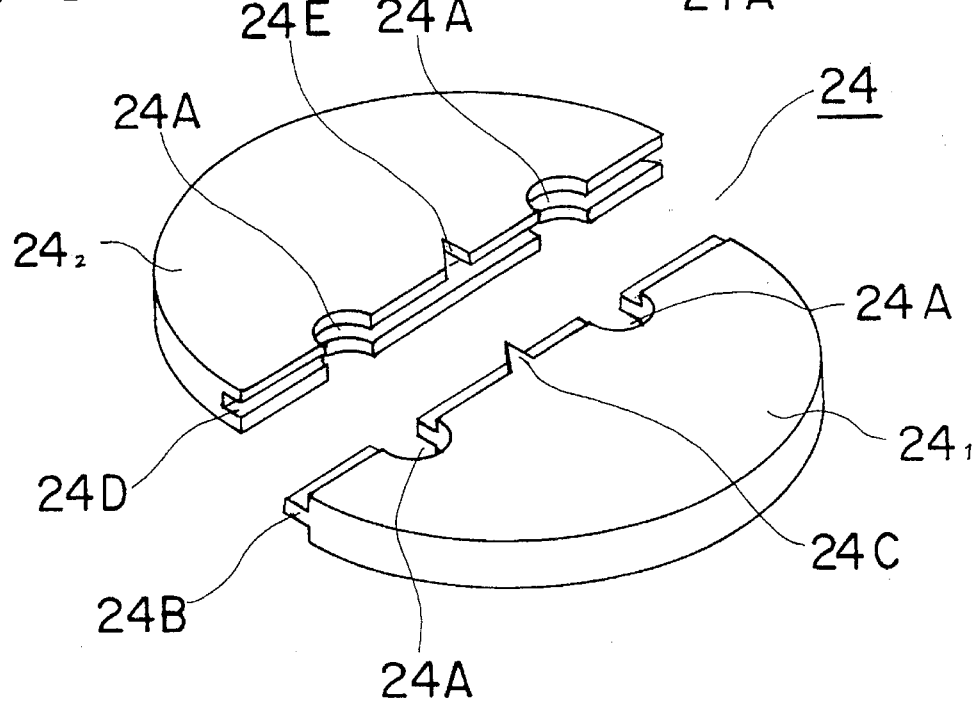

FIGS. 10A and 10B show in perspective different adhesive stoppers suitable for tape carrier assembling.

Adhesive stoppers 24, each composed of two half members, as shown in FIGS. 10A and 10B are effective for use in tape carrier packaging in the automatic fabrication system shown in FIG. 9.

The adhesive stopper 24 shown in FIG. 10A is composed of two half members $24_1$, $24_2$ divided along a diametrical line passing through a pair of holes 24A for insertion of the respective lead terminals 1 therethrough. Since the adhesive stopper 24 is made up of the two half members $24_1$, $24_2$, they can easily be coupled to the lead terminals 1 in the case assembling process after the lead terminals 1 have been temporarily attached to the tap 22.

Inasmuch as the adhesive stopper 24 is made up of the two simple half members $24_1$, $24_2$, it is difficult to connect them to the lead terminals 1 in the case assembling process while the capacitor assembly 7 remains exposed. It is therefore necessary to attach the adhesive stopper 24 to the lead terminals 1 and clamp the circumferential edge of the adhesive stopper 24 with the case 15 after the capacitor assembly 7 has been placed in the case 15.

The adhesive stopper 24 shown in FIG. 10B is also composed of two half members $24_1$, $24_2$ divided along a diametrical line passing through a pair of holes 24A for insertion of the respective lead terminals 1 therethrough. In addition, the half member $24_1$ has a ridge 24B extending along the diametrical edge thereof and projecting toward the other half member $24_2$, and a positioning key 24C positioned centrally on the diametrical edge thereof and projecting toward the other half member $24_2$. The half member $24_2$ has a groove 24D defined in and extending along the diametrical edge thereof for receiving the ridge 24B of the half member $24_1$, and a positioning notch 24E defined centrally in the diametrical edge thereof for receiving the positioning key 24C of the half members $24_1$. When the half members $24_1$, $24_2$ are combined with each other, the ridge 24B is fitted in the groove 24D and the positioning key 24C is fitted in the positioning notch 24E, so that the half members $24_1$, $24_2$ are firmly joined to each other.

In the automatic fabrication system, the adhesive stopper 24 shown in FIG. 10B is pushed into a certain position in the case 15 where the diameter of the case 15 is smaller than the diameter of the remainder thereof by a dimension in the range of from about 20 [μm] to 30 [μm]. Therefore, when the adhesive stopper 24 is pushed into the case 15, the adhesive stopper 24 is pressed radially inwardly by the reduced-diameter portion of the case 15, thereby pressing the lead terminals 1 inserted through the holes 24A.

In the above embodiments, the lead terminals 1 extend from one end of the capacitor assembly 7. However, the lead terminals 1 may extend in opposite directions from the respective opposite ends of the capacitor assembly 7. If such a modification is combined with the case 15 shown in FIGS. 2A through 2D, then the opening 15A in the case 15 may be displaced out of interference with the lead terminals 1.

According to the present invention, as described above, an anode foil with a lead terminal fixed thereto, a cathode foil with a lead terminal fixed thereto, and separators are coiled into a capacitor assembly, and the lead terminals are inserted through holes defined in a sealing cap of rubber or an adhesive stopper. After an adhesive which hermetically seals the lead terminals and the sealing cap or the adhesive stopper with respect to each other is heated until it is fully set, the capacitor assembly is impregnated with an electrolytic solution.

Since the lead terminals and the sealing cap are held in highly intimate contact with each other, the electrolytic solution is prevented from leaking out between the lead terminals and the sealing cap. The adhesive which sealingly bonds the lead terminals and the sealing cap or the adhesive stopper to each other is set with heat in the absence of any electrolytic solution. Consequently, the adhesive, which may be made of an epoxy resin, for example, can be well set at a high temperature for increased fluid-tightness. After the capacitor assembly with the lead terminals extending therefrom has been sealed in a case in a fluid-tight manner, an opening defined in the case for introducing the electrolytic solution and discharging a hydrogen gas therethrough can easily be closed off by a heating iron.

Although certain preferred embodiments of the present invention have been shown and described in detail, it should be understood that various changes and modifications may be made therein without departing from the scope of the appended claims.

What is claimed is:

1. A method of manufacturing an electrolytic capacitor, comprising the steps of:
    coiling an anode foil with a lead terminal fixed thereto, a cathode foil with a lead terminal fixed thereto, and a separator into a capacitor assembly;
    attaching a sealing cap made of an elastomeric material and having holes, to the capacitor assembly by inserting the lead terminals through the respective holes with an adhesive applied thereto;
    heating said adhesive until the adhesive is set so as to bond said lead terminals and said sealing cap to each other;
    impregnating said capacitor assembly with an electrolytic solution; and
    inserting said capacitor assembly with said sealing cap attached thereto into a case and sealing the capacitor assembly in said case.

2. A method of manufacturing an electrolytic capacitor, comprising the steps of:
    coiling an anode foil with a lead terminal fixed thereto, a cathode foil with a lead terminal fixed thereto, and a separator into a capacitor assembly;
    attaching a sealing cap made of an elastomeric material and having holes, to the capacitor assembly by inserting the lead terminals with an adhesive applied thereto through the respective holes;
    heating said adhesive until the adhesive is set so as to bond said lead terminals and said sealing cap to each other;
    impregnating said capacitor assembly with an electrolytic solution; and
    inserting said capacitor assembly with said sealing cap attached thereto into a case and sealing the capacitor assembly in said case.

3. A method of manufacturing an electrolytic capacitor, comprising the steps of:
    coiling an anode foil with a lead terminal fixed thereto, a cathode foil with a lead terminal fixed thereto, and a separator into a capacitor assembly;
    attaching an adhesive stopper with holes by inserting the lead terminals through said respective holes;
    inserting said capacitor assembly with the adhesive stopper attached thereto into a case having an opening for introducing an electrolytic solution and discharging a gas;
    applying an adhesive to a side of said case where said adhesive stopper is positioned and heating said adhesive until the adhesive is set so as to bond said adhesive stopper and said lead terminals to each other and seal said capacitor assembly in said case;
    introducing an electrolytic solution through said opening to impregnate said capacitor assembly with the electrolytic solution; and
    closing said opening to seal said case.

4. A method of manufacturing an electrolytic capacitor, comprising the steps of:
    coiling an anode foil with a lead terminal fixed thereto, a cathode foil with a lead terminal fixed thereto, and a separator into a capacitor assembly;
    inserting said capacitor assembly into a case having an opening for introducing an electrolytic solution and discharging a gas;
    attaching an adhesive stopper with holes to said capacitor assembly in said case by inserting the lead terminals through said respective holes;
    applying an adhesive to a side of said case where said adhesive stopper is positioned and heating said adhesive until the adhesive is set so as to bond said adhesive stopper and said lead terminals to each other and seal said capacitor assembly in said case;
    introducing an electrolytic solution through said opening to impregnate said capacitor assembly with the electrolytic solution; and
    closing said opening to seal said case.

5. A method according to claim 3 or 4, wherein said adhesive stopper is composed of two half members divided along a line passing through the respective holes defined therein.

6. A method according to claim 5, wherein a plurality of said capacitor assemblies with lead terminals are attached at said lead terminals to a carrying tape so that the respective steps are performed while said carrying tape carries said plural capacitor assemblies.

7. A method according to claim 3 or 4, further comprising the step of:
    after said adhesive stopper is inserted in said case, a portion of said case is heated and pressed against said adhesive stopper by a heating iron.

8. A method according to claim 3 or 4, further comprising the step of:
    fitting a plug into said opening until a tip end of the plug is held against said capacitor assembly thereby closing said opening and sealing said case.

9. A method according to claim 3 or 4, wherein said step of closing said opening is performed by placing a heat iron on said opening so as to melt the opening and seal said case.

10. A method according to claim 9, wherein after said heating iron is placed on the opening, said heating iron is cooled down then is removed from said case.

11. A method according to claim 3 or 4, further comprising the step of
    aging said capacitor assembly between the steps of impregnating and closing said opening.

* * * * *

UNITED STATES PATENT AND TRADEMARK OFFICE
CERTIFICATE OF CORRECTION

PATENT : 5,580,358
DATED : December 3, 1996
INVENTOR(S) : Hitoshi Narusawa et al It is certified that error appears in the above-identified patent and that said Letters Patent is hereby corrected as shown below:

On the title page, after "[73] Assignee: Shoei Co., Ltd., Tokyo, Japan" insert the following:

--; Adphox Corporation, Tokyo, Japan--.

Signed and Sealed this

Fourth Day of November, 1997

Attest:

BRUCE LEHMAN

Attesting Officer

Commissioner of Patents and Trademarks